United States Patent
Syse et al.

(10) Patent No.: US 7,210,503 B2
(45) Date of Patent: May 1, 2007

(54) METHOD AND DEVICE FOR INCREASING SAFETY DURING PIPELAYING

(75) Inventors: Harald Syse, Røyneberg (NO); Jostein Aleksandersen, Randaberg (NO)

(73) Assignee: TDW Offshore Services AS, Stavanger (NO)

( * ) Notice: Subject to any disclaimer, the term of this patent is extended or adjusted under 35 U.S.C. 154(b) by 0 days.

(21) Appl. No.: 10/494,727

(22) PCT Filed: Nov. 11, 2002

(86) PCT No.: PCT/NO02/00418

§ 371 (c)(1),
(2), (4) Date: May 26, 2004

(87) PCT Pub. No.: WO03/042594

PCT Pub. Date: May 22, 2003

(65) Prior Publication Data

US 2004/0261873 A1     Dec. 30, 2004

(30) Foreign Application Priority Data

Nov. 13, 2001   (NO) ................................. 20015555

(51) Int. Cl.
*F16L 55/10*     (2006.01)
(52) U.S. Cl. .......................... 138/91; 138/89; 138/90; 405/169; 405/717
(58) Field of Classification Search ................ 138/90, 138/89; 405/169, 171, 168.2, 168.1
See application file for complete search history.

(56) References Cited

U.S. PATENT DOCUMENTS

| | | | | |
|---|---|---|---|---|
| 3,842,612 A | * | 10/1974 | Arnold ........................ | 405/173 |
| 3,890,693 A | * | 6/1975 | Eagleton et al. ............... | 29/429 |
| 3,943,982 A | * | 3/1976 | Lecordier ..................... | 138/89 |
| 3,977,201 A | * | 8/1976 | Bittner ........................ | 405/170 |
| 3,978,678 A | * | 9/1976 | Duncan et al. ............. | 405/171 |
| 4,098,091 A | * | 7/1978 | Desai et al. ................. | 405/169 |
| 4,252,465 A | * | 2/1981 | Broussard et al. .......... | 405/158 |
| 4,342,519 A | * | 8/1982 | Botrel et al. ................. | 405/169 |
| 4,498,811 A | * | 2/1985 | Fern et al. ............... | 405/168.1 |
| 5,029,614 A | * | 7/1991 | Lara et al. ..................... | 138/90 |

FOREIGN PATENT DOCUMENTS

| | | | |
|---|---|---|---|
| FR | 2468827 | | 5/1981 |
| FR | 2468827 A | * | 5/1981 |

* cited by examiner

*Primary Examiner*—Patrick F. Brinson
(74) *Attorney, Agent, or Firm*—Gable Gotwals

(57) ABSTRACT

A method and device for preventing water from penetrating into the rising part/intermediate section (12) of a pipe (6) when laying the pipe (6) on or near the seabed (8) by means of a pipelay vessel (1), and where a plug (22) that seals against, travels and locks in the inside passage of the pipe (6) is arranged inside the pipe (6) between the lay vessel (1) and the seabed (8), where during normal pipelaying the plug (22) is displaced in the pipe (6) so as to essentially maintain its relative position relative to the pipelay vessel (1), and where in the event of water flowing into the pipe (6), the plug (22) is locked in the pipe (6), whereby water is prevented from filling the rising part/intermediate section (12) of the pipe (6).

1 Claim, 4 Drawing Sheets

METHOD AND DEVICE FOR INCREASING SAFETY DURING PIPELAYING

This invention regards a method of ensuring that the proportion of the weight of a pipeline that in the event of a leakage in the pipe is transferred to a lay vessel when laying a pipe at great depths, does not exceed the load capacity of the lay vessel or the equipment on the lay vessel.

When laying pipelines on the seabed by means of a pipelay vessel where the pipeline is welded together from lengths of pipe, the pipe is normally laid in a dry state. This means that the pipe is full of air or another gas during laying.

According to known techniques of pipelaying, pipe stands are welded together to form a pipeline on the deck of the lay vessel. Alternatively, the pipe length is pre-welded and wound onto a drum. For a so-called S-lay, the finished pipe is fed continuously over the side/stern of the ship and into the sea by means of an output ramp, a so-called stinger, which guides the pipe into the sea and ensures that the pipe does not experience too small a bending radius at the upper curve during the feeding out. Alternatively, the so-called J-lay method is used, where the pipe is let out vertically from the vessel. Down at the seabed, the pipe assumes a new curve, the lower curve, where the bending radius is dependent on among other things depth, the weight of the pipe and the tensile force applied to the pipe by the lay vessel.

Thus during the laying, the pipe assumes the shape of an S or a J in the sea. When laying pipes at great depths, the mass of the section of the pipe located between the lay vessel and the seabed represents a considerable weight. By filling the pipe with gas, the buoyancy of the pipe helps relieve the lay vessel of the weight of the pipe. This makes it possible to use a lay vessel of a considerably smaller size than that which would be required if the pipe were to be full of liquid during the laying operation.

The greatest stresses experienced by the pipe during the laying operation are found in the bending zones immediately behind the lay vessel and down at the seabed. Instances are known where pipes have not been able to bear the strain to which they are subjected during laying, thus causing leakages to occur. Such leakages may be due to defects in the welding or the material, or a stability problem may occur, which causes the pipe to collapse over a certain distance, creating longitudinal cracks.

When a leakage occurs and the pipe is filled with water, the pipe loses all or part of its buoyancy. Such leakages may have catastrophic consequences, in that the net weight of that portion of the pipe which is located in the sea between the lay vessel and the seabed exceeds the load capacity of the lay vessel. This may cause the pipe to detach from the production equipment on the lay vessel and fall down to the seabed, thus incurring further damage. Obviously, such an unintended event or accident involves a great risk of personal injury and material damages.

The object of the invention is to remedy the disadvantages of prior art.

The object is achieved in accordance with the invention by the characteristics stated in the description below and in the appended claims.

As mentioned above, the greatest stresses experienced by the pipe during laying are found in those portions where it experiences the greatest bending stress. These are the portions where there is a risk of leakage occurring. By arranging an upper plug internally in the pipe immediately below the bend behind the lay vessel, the upper bend, and a lower plug immediately above the bend at the seabed, the lower bend, any inflow of water through a damaged part of the pipe can be prevented from filling a pipe section between the upper and the lower bends, hereinafter called the intermediate pipe section.

If a leakage were to occur in the upper bend, the water is prevented from penetrating into the intermediate pipe section by the upper plug being locked in the pipe and providing a seal, or alternatively being held in place by a line running between the upper plug and an attachment point in the lay vessel.

Correspondingly; were a leakage to occur in the lower bend or in the portion of the pipe situated on the seabed, the lower plug is locked into the pipe, providing a seal, whereby water is prevented from penetrating up and into the intermediate pipe section.

Advantageously, the plugs may be connected to the lay vessel by means of a wire running through the pipe and from the vessel to the upper plug, and a wire running from the upper to the lower plug. During the pipelaying operation, when the pipe is being fed out continuously, the plugs are displaced in the pipe, thus maintaining their relative position relative to the lay vessel and thereby the upper and lower bends.

Wellbore tractors of a construction that is known per se may be used to transport the plugs to their predetermined positions in the pipe.

The plugs may be equipped with e.g. an acoustic sensor to detect ingress of water in the pipe, a sensor to detect the internal diameter of the pipe, a pressure switch and possibly a water sensor, and they may be designed to automatically or through remote control connect to the internal wall of the pipe in a locking manner if the available measurements indicate that water is flowing into the pipe.

The following describes a non-limiting example of a preferred embodiment illustrated in the accompanying drawings, in which.

Figure 1:
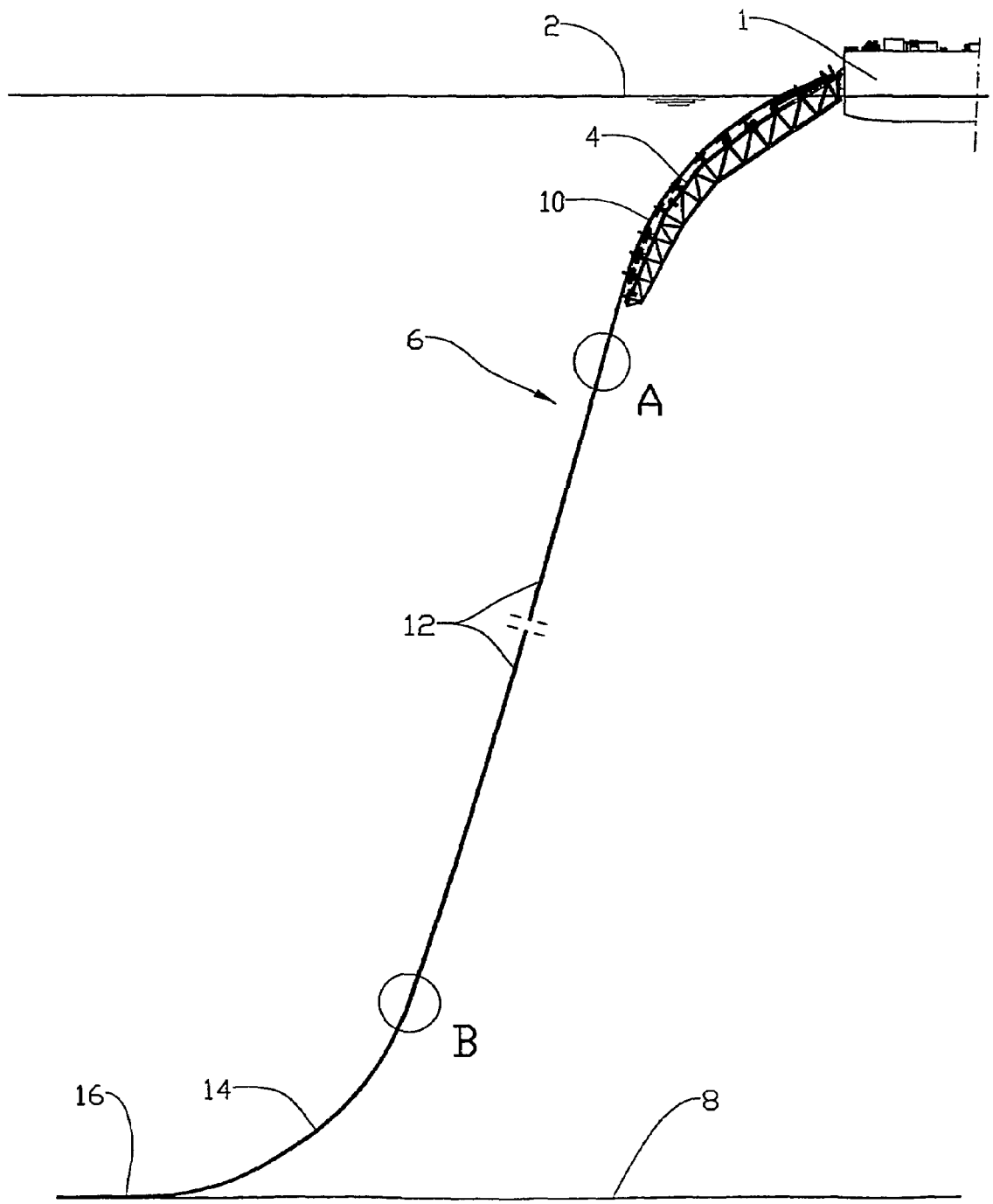
FIG. 1 shows a pipelay vessel during the laying of a pipeline, the plugs being located in the pipe at the positions marked A and B, respectively.

In the drawings, reference number 1 denotes a pipelay vessel on the surface of the sea 2, where the pipelay vessel 1 is equipped with a stinger 4 for laying of a pipe 6 on the seabed 8.

While being fed across the stinger 4, the pipe 6 is subjected to bending in the downward direction, thereby forming an upper bend 10. Below the upper bend 10, the pipe runs as an intermediate pipe section 12, essentially in a straight line to a lower bend 14. The lower bend is formed at the transition between the intermediate pipe section 12 and the portion 16 of the pipe 6 situated on the seabed 8.

Figure 2:
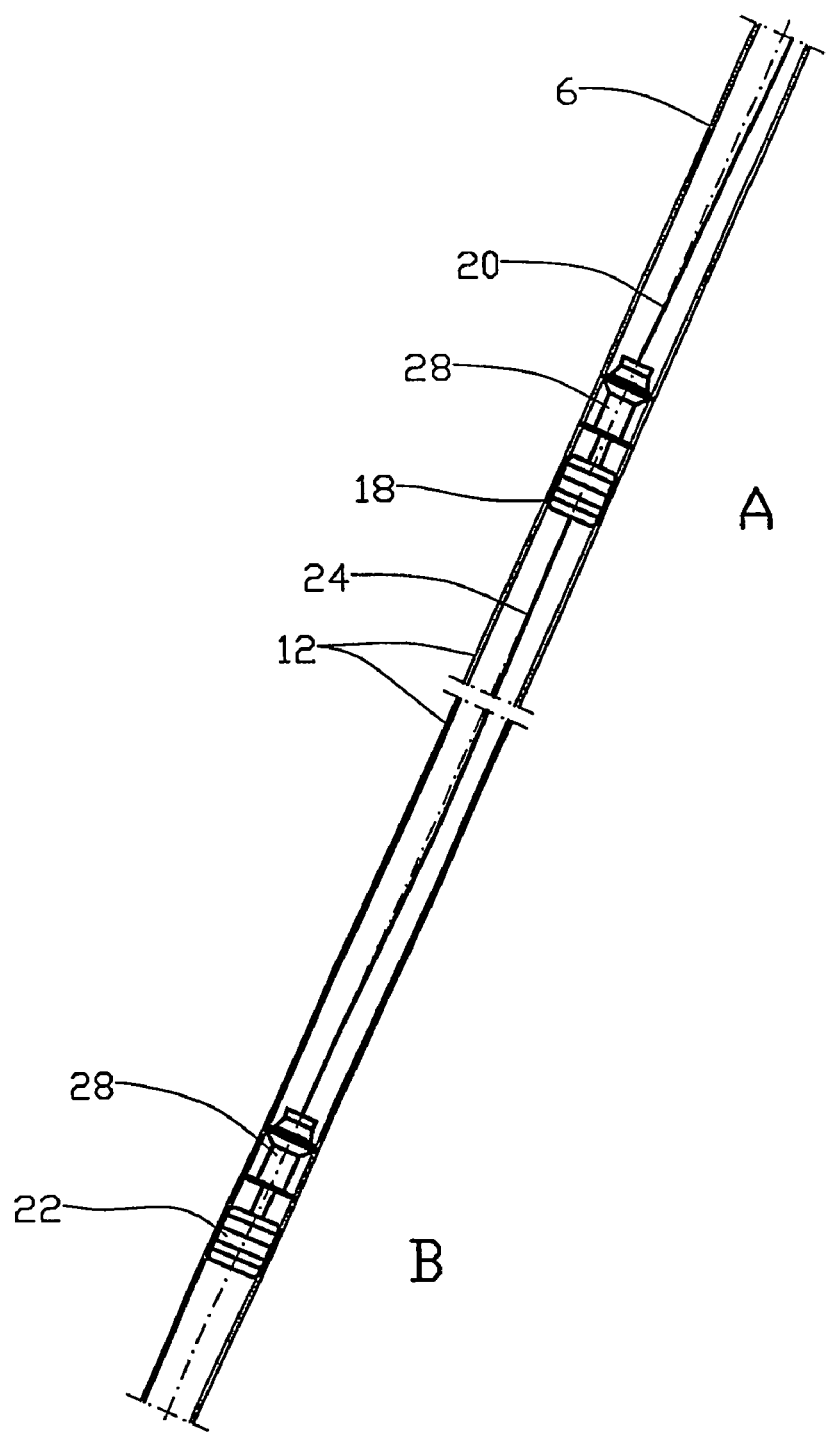
FIG. 2 shows an enlargement of a section at A and B in FIG. 1, where the plugs are arranged in the appropriate positions, and where the plugs are displaced in the pipe as the pipe is laid.

In the transition zone between the upper bend 10 and the intermediate pipe section 12, a sealing, travelling and lockable upper plug 18 is arranged, connected to the structure of the lay vessel 1 by means of an upper wire 20, see FIG. 2. Preferably, the wire 20 is equipped with cables and/or fluid conduits for supply of energy to and communication with the plug 18 and other plugs, see below. Wireless communication may also be employed.

A sealing, travelling and lockable lower plug 22 is arranged inside the pipe 6 in the transition zone between the intermediate pipe section 12 and the lower bend 14. A lower wire 24, which may of the same type as the upper wire 20, runs between the upper plug 18 and the lower plug 22.

The plugs 18, 22 are each equipped with at least one pressure sensor (not shown) and at least one water sensor (not shown). The pressure sensors are designed to measure the ambient pressures at their respective plugs 18 and 22. A pressure increase may be an indication that water is flowing into the pipe. The water sensors detect whether there is water at the monitoring points.

The plugs 18, 22 are moved to their predetermined positions inside the pipe 6 by means of e.g. one or more wellbore tractors 28 of a construction that is known per se. The wires 20, 24, which if so desired may be replaced by another type of long, load bearing element, are designed to maintain the plugs 18, 22 in a correct relative position in the pipe 6 during the laying operation.

During normal operation, the plugs 18, 22 are displaced in the pipe 6 as the pipe is fed out from the lay vessel 1.

Figure 3:
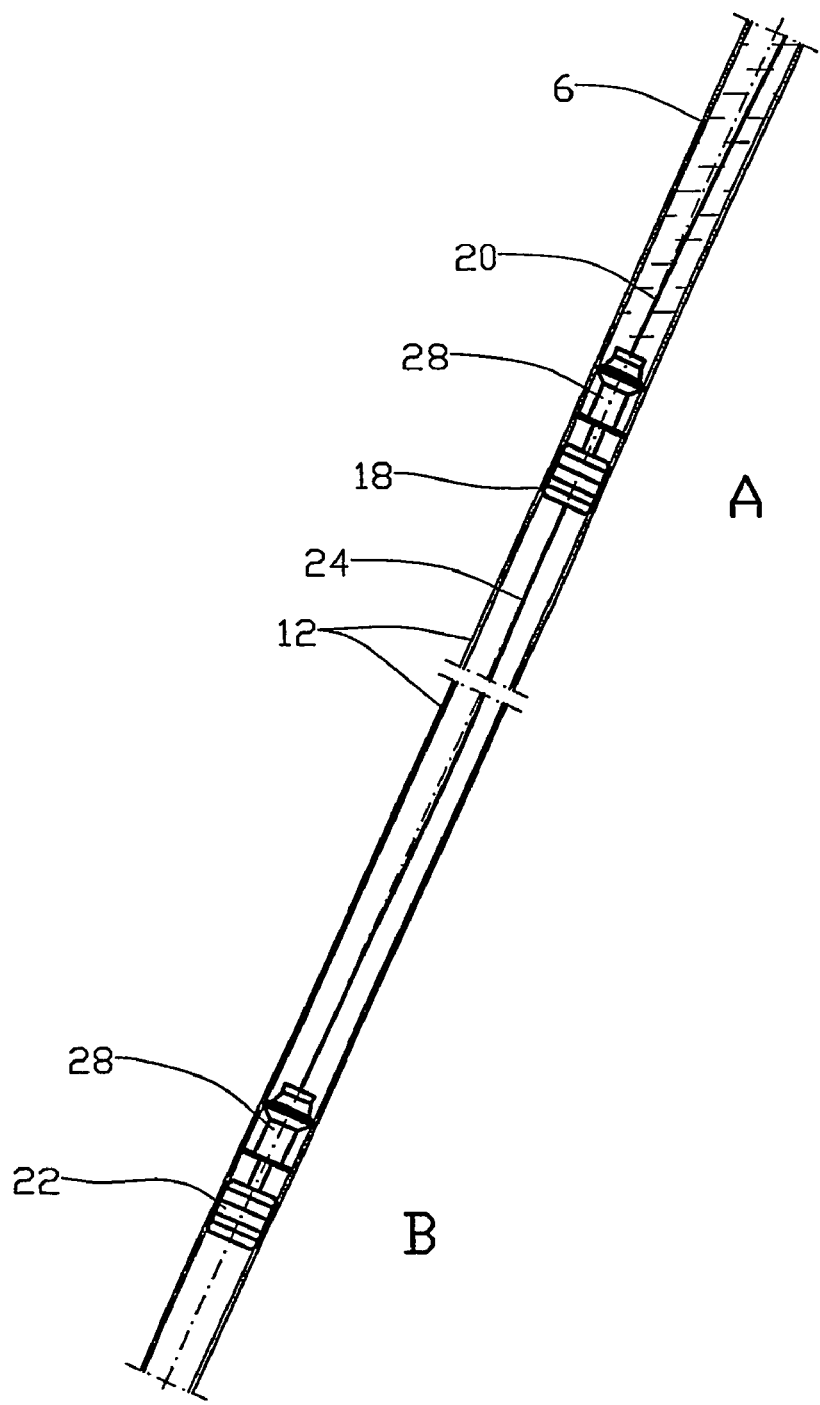
FIG. 3 shows the same as FIG. 2, but here the upper plug is locked in the pipe due to ingress of water above the plug.

In the event of a leakage occurring in the upper bend 10, water will flow down through the pipe 6 to the upper plug 18. The pressure and/or water sensor by the upper plug 18 will thereby emit a signal to the plug control system (not shown), which automatically locks the plug 18 in the pipe 6 by means of the locking means (not shown) of the plug, see FIG. 3. Alternatively, the measurement signal can be evaluated by an operator who may carry out remote-control locking of the plug in the pipe 6.

The water flowing into the upper bend 10 is thus prevented from flowing down into the intermediate section 12 of the pipe 6, whereby the intermediate pipe section 12 maintains its buoyancy. The pipe 6 may be pulled back into the lay vessel 1, where the damage can be repaired before resuming the laying.

Figure 4:
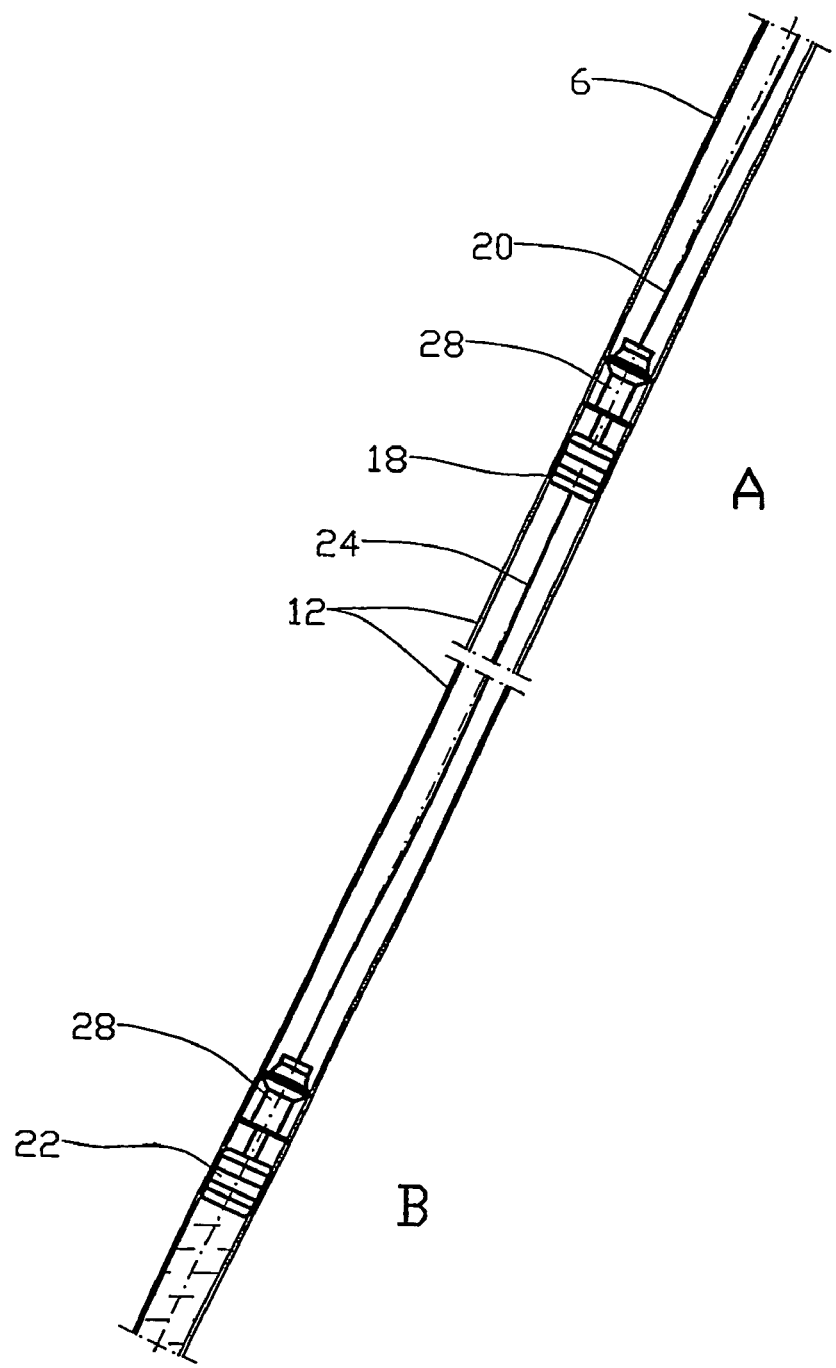
FIG. 4 shows the same as FIG. 2, but here the lower plug is locked in the pipe due to ingress of water below the plug.

Correspondingly; if a leakage were to occur in the lower bend 14 or the portion 16 of the pipe 6 situated on the seabed, water is prevented from penetrating up into the intermediate pipe section 12 by the lower plug 22 being locked in the pipe 6, see FIG. 4. The pipe 6 may then be repaired in accordance with known procedures without causing further damage to the pipe 6 or the lay vessel 1.

In order to achieve adequate protection against the intermediate pipe section 12 being filled with water, it is necessary to use one plug at the lower end and one plug at the upper end. However, partial protection may be obtained by using only one plug.

The invention claimed is:

1. A system of preventing water from penetrating into an intermediate section of a pipeline when laying the pipeline on a seabed by means of a pipelay vessel, the intermediate section extending from near the pipelay vessel to near the seabed, comprising a first plug that is capable of sealing the inside of the pipeline and is displaced in the pipeline intermediate section so as to maintain a position in proximity to said pipelay vessel, and in the event of water flowing into said pipeline, said first plug can be locked in a sealing manner whereby water is prevented from filling the said pipeline intermediate section and a second plug that is capable of sealing the inside of the pipeline and is displaced in the pipeline intermediate section so as to maintain a position in proximity to said seabed, and in the event of water flowing into said pipeline said second plug can be locked in a sealing manner whereby water is prevented from filling the said pipeline intermediate section, and wherein a first water sensor carried by said first plug responds to actuate said first plug if water is sensed within the pipeline between said first plug and said pipelay vessel and a second water sensor carried by said second plug responds to actuate said second plug if water is sensed within the pipeline between said second plug and said seabed.

* * * * *